United States Patent
Hochstetler et al.

(10) Patent No.: US 10,422,324 B2
(45) Date of Patent: Sep. 24, 2019

(54) WEAR RING FOR INTEGRATED DRIVE GENERATOR

(71) Applicant: HAMILTON SUNDSTRAND CORPORATION, Charlotte, NC (US)

(72) Inventors: Derek R. Hochstetler, Rockford, IL (US); Ted A. Martin, Byron, IL (US); Duane C. Johnson, Beloit, WI (US); Glenn C. Lemmers, Jr., Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 84 days.

(21) Appl. No.: 15/820,673

(22) Filed: Nov. 22, 2017

(65) Prior Publication Data

US 2019/0154014 A1 May 23, 2019

(51) Int. Cl.
F16H 61/42 (2010.01)
F04B 1/20 (2006.01)

(52) U.S. Cl.
CPC .......... F04B 1/2014 (2013.01); F16H 61/42 (2013.01)

(58) Field of Classification Search
CPC .... F04B 1/2014; F04B 1/2021; F04B 1/2028; F16H 61/40; F16H 61/42
See application file for complete search history.

(56) References Cited

U.S. PATENT DOCUMENTS

| | | | | |
|---|---|---|---|---|
| 5,247,794 A | * | 9/1993 | Benson | F16H 39/14 60/487 |
| 7,101,158 B2 | * | 9/2006 | Hembree | F04D 13/025 417/420 |
| 7,472,547 B2 | * | 1/2009 | Grosskopf | F16H 39/14 60/487 |
| 9,089,989 B2 | * | 7/2015 | Hortling | B27B 5/32 |
| 2006/0125308 A1 | * | 6/2006 | Sollami | E21C 35/197 299/107 |
| 2018/0269817 A1 | * | 9/2018 | Patel | H02P 9/48 |

FOREIGN PATENT DOCUMENTS

| | | |
|---|---|---|
| EP | 3048302 | 7/2016 |
| FR | 2710376 | 3/1995 |
| JP | 2000048798 | 2/2000 |

OTHER PUBLICATIONS

The Extended European Search Report for EP Application No. 18207233.0, dated Apr. 10, 2019.

* cited by examiner

Primary Examiner — Michael Leslie
(74) Attorney, Agent, or Firm — Carlson, Gaskey & Olds, P.C.

(57) ABSTRACT

A wear ring for use in an integrated drive generator has a cylindrical body defining an axis and having a tab extending radially outwardly of an outer cylindrical surface of the cylindrical body. The tab has a radially outer point. A ratio of a first radius to the outer cylindrical surface from the axis to a second radius extending to the radially outer point from the axis is between 0.90 and 0.95. An integrated drive generator and a method are also disclosed.

20 Claims, 4 Drawing Sheets

WEAR RING FOR INTEGRATED DRIVE GENERATOR

BACKGROUND

This application relates to a wear ring for an integrated drive generator.

Integrated drive generators are known and often utilized in aircraft. As known, a gas turbine engine on the aircraft provides a drive input into a generator input shaft. The generator typically includes a disconnect shaft that can transmit the input into a gear differential. The gear differential selectively drives a main generator to provide electric power for various uses on the aircraft.

It is desirable that the generated power be of a desired constant frequency. However, the speed from the input shaft will vary during operation of the gas turbine engine. This would result in variable frequency.

Integrated drive generators are provided with speed trimming hydraulic units. Gears associated with the differential and, in particular, a ring gear portion, provide rotation from the differential back into the trimming unit. A carrier also rotates another portion of the trimming unit. The trimming unit is operable to result in the output speed of the differential being effectively constant, such that electric power of a desirable frequency is generated.

The generator is mounted between two housing portions and a seal plate is mounted between the two housing portions.

In addition, various accessory systems, such as various pumps, are driven by the output ring gear of the differential through an accessory drive gear.

A wear ring that is incorporated into the trimming unit faces design challenges.

SUMMARY

A wear ring for use in an integrated drive generator has a cylindrical body defining an axis and having a tab extending radially outwardly of an outer cylindrical surface of the cylindrical body. The tab has a radially outer point. A ratio of a first radius to the outer cylindrical surface from the axis to a second radius extending to the radially outer point from the axis is between 0.90 and 0.95. An integrated drive generator and a method are also disclosed.

These and other features may be best understood from the following drawings and specification.

DETAILED DESCRIPTION

Figure 1:
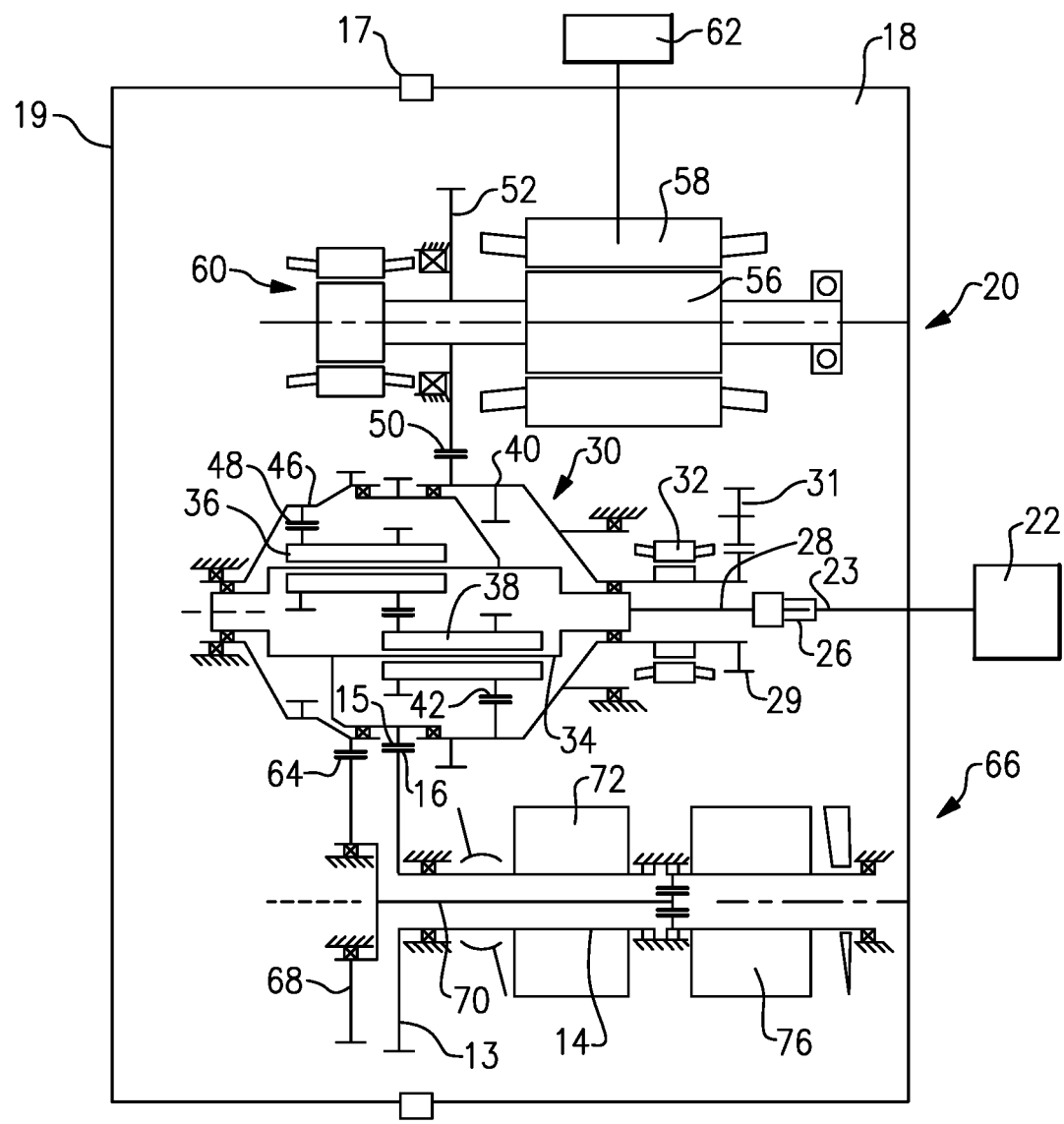
FIG. 1 schematically shows an integrated drive generator.

FIG. 1 shows an integrated drive generator 20. As shown, housing portions 18 and 19 surround the integrated drive generator and a seal plate 17 sits between the housing portions 18 and 19.

A gas turbine engine 22 may drive an input shaft 23 which selectively drives a disconnect assembly 26. The disconnect assembly 26, in turn, drives a carrier shaft 28, which drives a carrier in a gear differential 30.

As the carrier shaft 28 rotates, planet gears 36 and 38 are caused to rotate. Gears 38 have a gear interface 42 with a first ring gear portion 40. Gears 36 have a gear interface 48 with a second ring gear portion 46.

Ring gear portion 40 has a gear interface 50 with a main generator drive gear 52. When drive gear 52 is driven to rotate, it rotates a rotor 56 associated with a stator 58 of the main generator as well as an exciter rotor 60. Electric power is generated for a use 62, as known.

It is desirable that the frequency of the generated electric power be at a desired frequency. This requires the input speed to gear 52 to be relatively constant and at the desired speed. As such, the speed of the input shaft 23 is added to the speed of the speed trimmer 66 to result in a constant input speed to gear 52.

A gear 15 that is part of the carrier has a gear interface 16 with a gear 13 driving a shaft 14 also within the speed trimmer.

As known, the speed trimmer 66 includes a variable unit 72 and a fixed unit 76. The units 72 and 76 may each be provided with a plurality of pistons and a swash plate arrangement. If the input speed of the gear 13 is too high, the speed of the gear 52 will also be too high, and hence, the speed trimmer 66 acts to lower the speed of the trim gear 46 which will drop the speed of gear 52. On the other hand, if the input speed is too low, the speed trimmer will increase the trim gear speed and the speed seen by gear 52 will increase.

In essence, the variable unit 72 receives an input through gear 13 that is proportional to the speed of the input shaft 23. The variable unit 72 also receives a control input from a control monitoring the speed of the generator rotor 56. The position of the swash plate in the variable unit 72 is changed to in turn change the speed and direction of the fixed unit 76. The fixed unit 76 can change the speed, and direction of rotation of the shaft 70, and this then provides control back through the trim ring gear 46 to change the speed reaching the generator. In this manner, the speed trimmer 66 results in the frequency generated by the generator being closer to constant, and at the desired frequency.

A permanent magnet generator 32 rotates with the ring gear 40.

An accessory drive shaft 29 rotates with the ring gear 40 and drives a plurality of accessory gears 31.

The operation of the integrated drive generator 20 is generally as known in the art. A worker of ordinary skill would recognize that the desired frequency and speed at use 62 would dictate a number of design functions.

Figure 2:
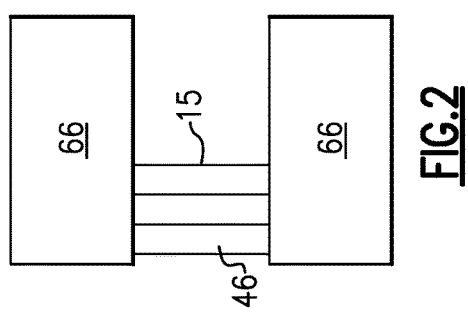
FIG. 2 schematically shows hydraulic units in the integrated drive generator.

FIG. 2 shows that there are a pair of hydraulic or speed trimming units 66 associated with a single ring gear 46 and a single carrier 15.

Figure 3:
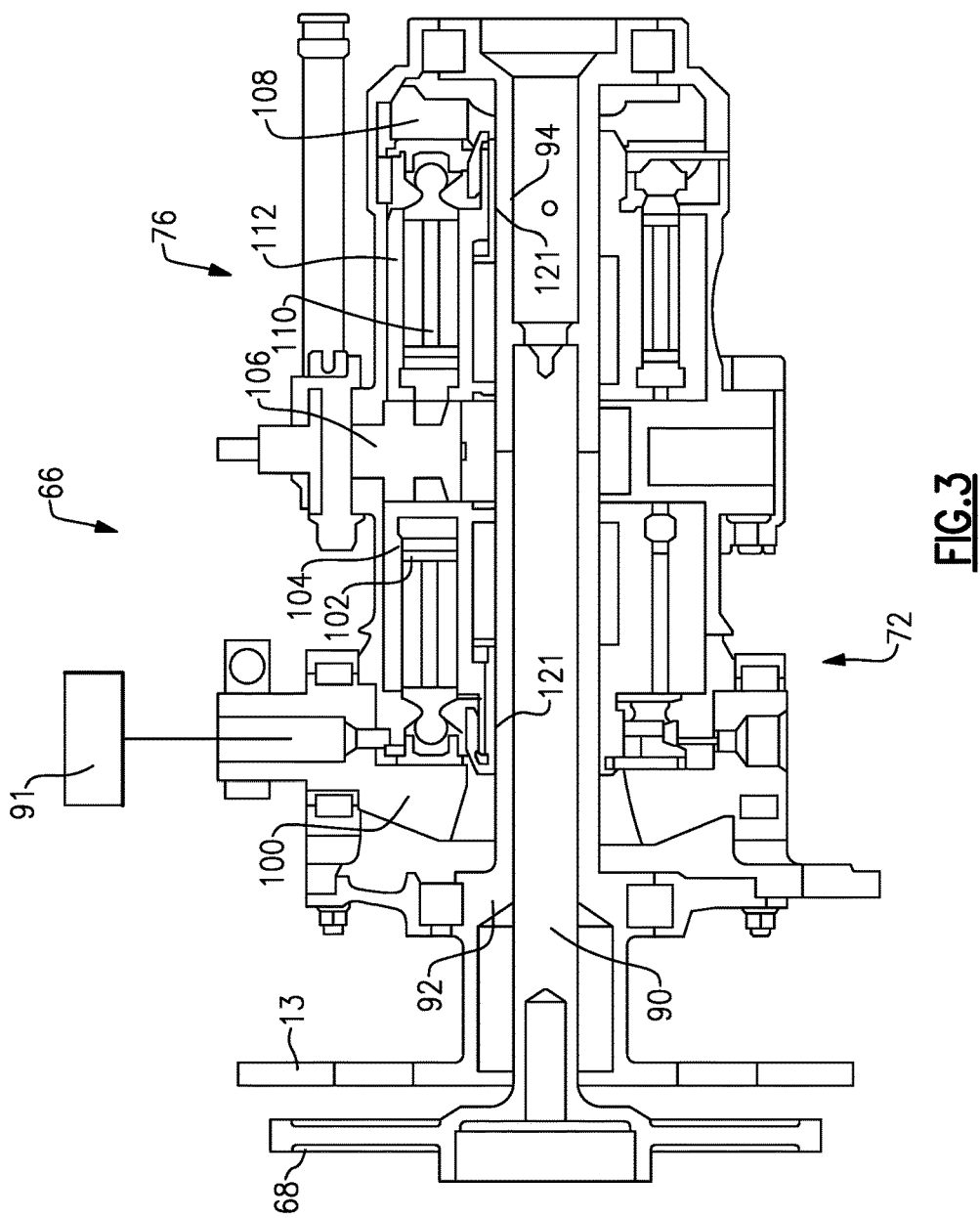
FIG. 3 shows the components of a hydraulic unit.

FIG. 3 shows details of the hydraulic unit 66. A speed into the gear 13 will be proportional to the speed from the input shaft 23. The gear 13 rotates with a shaft 92. The shaft, through splined teeth 121, drives a cylinder block 104 to rotate.

A control 91 changes the position of a swash plate 100 based upon the input speed seen at the generator. As the cylinder block 104 rotates, pistons 102 within the cylinder block cam off a surface of the swash plate 100. As the position of the swash plate 100 is changed by control 91, the amount of hydraulic fluid driven by the pistons 102, through a port plate 106, and against piston 110 in a cylinder block 112 changes. As the pistons 110 move, they cam off a surface of fixed swash plate 108. This results in a control of a speed and direction of rotation of cylinder block 112. Cylinder block 112 has a spline connection at 121 to a shaft 94. Thus, the hydraulic unit 66 results in a desired speed and direction of rotation of the shaft 94, ultimately based upon the speed seen at the generator. The shaft 94 drives the shaft 90 to in turn drive the gear 68. The gear 68 interacts with the trim ring gear 46 such that the ultimate speed leaving the differential 30 to the gear 52 is controlled to achieve a constant desired speed at the generator.

The cylinder blocks 104 and 112 are effectively identical. In addition, there are similar cylinder blocks 104/112 in both of the hydraulic units 66.

Figure 4A:
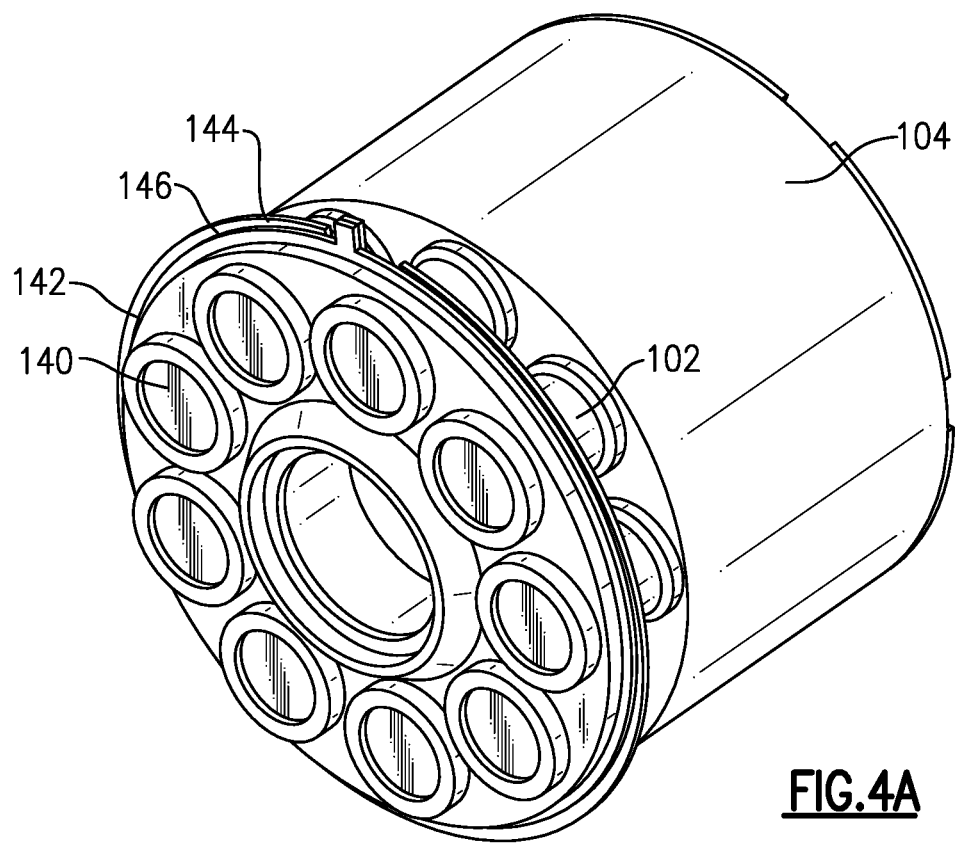
FIG. 4A shows a detail of a portion of the FIG. 3 hydraulic units.

FIG. 4A shows cylinder block 104 that houses pistons 102. Heads 140 of the piston are shown guided in a piston retainer 142. A retaining ring 144 snaps into the swash plate 100. In addition, a wear ring 146 is positioned intermediate the snap ring and the piston retainer 142.

Figure 4B:
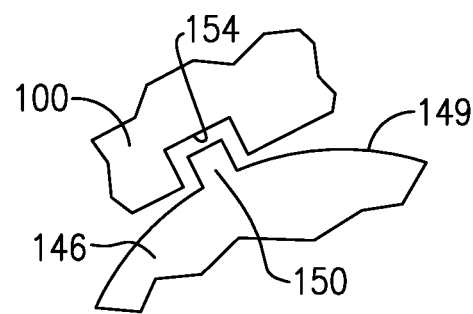
FIG. 4B shows a further detail.

FIG. 4B shows a detail of the wear ring 146. A tab 150 extends radially outwardly of a nominal outer cylindrical surface 149 of a cylindrical body 147. The tab 150 fits into a bore 154 in the variable swash plate 100 to prevent rotation of the wear ring 146.

Figure 5:
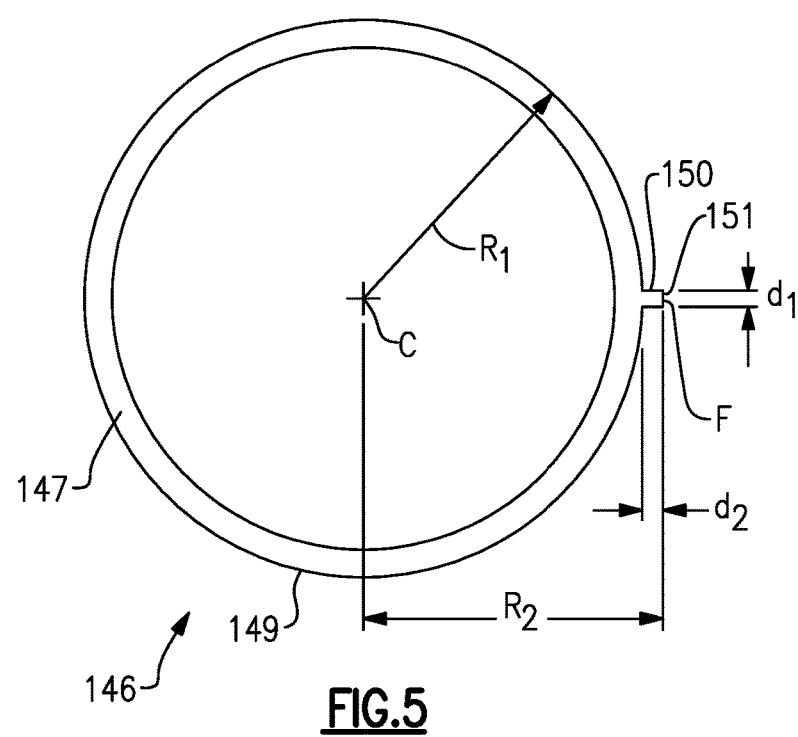
FIG. 5 shows a wear ring.

FIG. 5 shows the wear ring 146. Wear ring 146 has a nominal outer cylindrical surface 149. The nominal outer cylindrical surface 149 is at a radius $R_1$ from a center axis C. The tab 150 is also shown. A radially outer point 151 of the tab 150 is at a radius $R_2$ from the center C. In embodiments, $R_1$ is 1.53 inches (3.886 centimeters) and $R_2$ is 1.65 inches (4.191 centimeters). For this application, all dimensions are within a tolerance range of plus/minus 0.010 inch (0.025 centimeters). As can be seen, an outer end of the tab 150 is a flat surface F and includes outer point 151.

A circumferential width $d_1$ of the flat surface F is 0.090 inch (0.229 centimeters). A distance $d_2$ is defined for the distance the tab 150 extends beyond the cylindrical surface 149. That is, $d_2$ is $R_2$ minus $R_1$ or 0.12 inch (0.305 centimeters).

Figure 6:
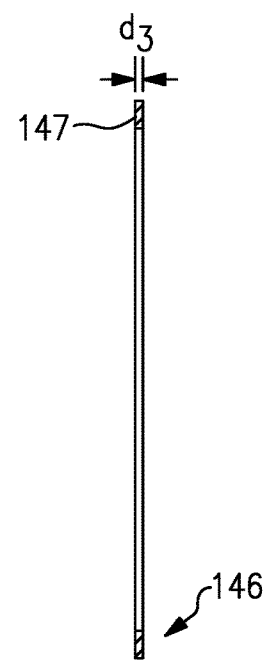
FIG. 6 shows another view of the wear ring.

FIG. 6 shows a thickness $d_3$ of the wear ring 146. In one embodiment, it is 0.031 inch (0.079 centimeters).

In embodiments, a ratio of $R_2$ to $R_1$ is between 1.05 and 1.10. A ratio of $R_1$ to $d_2$ is between 10 and 15. A ratio of $R_1$ to $d_1$ is between 20 and 30. A ratio of $R_1$ to $d_3$ is between 40 and 60.

A method of replacing a wear ring 146 in an integrated drive generator includes the steps of removing an existing wear ring from an integrated drive generator. The integrated drive generator includes an input shaft driving a differential. The differential provides an input drive to a generator for generating electricity. The differential also is connected with a hydraulic unit. The hydraulic unit includes a variable swash plate associated with a set of pistons, and a cylindrical block. The set of pistons are received in a piston retainer. A retaining ring is intermediate the piston retainer and the cylinder block. The existing wear ring was positioned intermediate the piston retainer and the retaining ring. A tab on the wear ring extended into a bore in a variable swash plate such that the wear ring does not rotate. The method includes the step of inserting a replacement wear ring, including a cylindrical body having a tab extending outwardly of an outer cylindrical surface. The tab has a radially outer point, and a ratio of a first radius to the outer cylindrical surface to a second radius extending to the radially outer point on the tab is between 0.90 and 0.95.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A wear ring for use in an integrated drive generator comprising:
   a cylindrical body defining an axis and having a tab extending radially outwardly of an outer cylindrical surface of said cylindrical body, said tab having a radially outer point, and a ratio of a first radius to said outer cylindrical surface from the axis to a second radius extending to the radially outer point from the axis is between 0.90 and 0.95.

2. The wear ring as set forth in claim 1, wherein said tab extends radially outwardly beyond the first radius for a first distance, and a ratio of said first radius to said first distance is between 10 and 15.

3. The wear ring as set forth in claim 2, wherein said radially outer point of said tab is on a flat surface extending over a width, and a ratio of said first radius to said width is between 20 and 30.

4. The wear ring as set forth in claim 3, wherein said wear ring has a thickness measured parallel to the axis such that a ratio of said first radius to said thickness is between 40 and 60.

5. The wear ring as set forth in claim 1, wherein said radially outer point on said tab is on a flat surface extending over a width, and a ratio of said first radius to said width is between 20 and 30.

6. The wear ring as set forth in claim 5, wherein said wear ring has a thickness measured parallel to the axis such that a ratio of said first radius to said thickness being between 40 and 60.

7. The wear ring as set forth in claim 1, wherein said wear ring having a thickness measured parallel to the axis such that a ratio of said first radius to said thickness is between 40 and 60.

8. An integrated drive generator comprising:
   an input shaft connected to a differential;
   said differential connected to a generator for generating electricity, and said differential also being connected with a hydraulic unit, said hydraulic unit including a variable swash plate, said variable swash plate being associated with a set of pistons, and a cylindrical block, said set of pistons being received in a piston retainer;
   a retaining ring intermediate said piston retainer and said cylinder block, and a wear ring positioned intermediate said piston retainer and said retaining ring; and
   said wear ring including a cylindrical body defining an axis having a tab extending outwardly of an outer cylindrical surface of said body, said tab having a radially outer point, and a ratio of a first radius to said outer cylindrical surface from the axis to a second radius extending to the radially outer point from the axis is between 0.90 and 0.95, said tab extending into a notch in said variable swash plate such that said wear ring does not rotate.

9. The integrated drive generator as set forth in claim 8, wherein said tab extends radially outwardly beyond the first radius for a first distance, and a ratio of said first radius to said first distance is between 10 and 15.

10. The integrated drive generator as set forth in claim 9, wherein said radially outer point of said tab is on a flat surface extending over a width, and a ratio of said first radius to said width is between 20 and 30.

11. The integrated drive generator as set forth in claim 10, wherein said wear ring has a thickness measured parallel to the axis such that a ratio of said first radius to said thickness of said body is between 40 and 60.

12. The integrated drive generator as set forth in claim 8, wherein said radially outer point of said tab is on a flat surface extending over a width, and a ratio of said first radius to said width is between 20 and 30.

13. The integrated drive generator as set forth in claim 12, wherein said wear ring having a thickness measured parallel to the axis such that a ratio of said first radius to said thickness being between 40 and 60.

14. The integrated drive generator as set forth in claim 8 wherein said wear ring having a thickness measured parallel to the axis such that a ratio of said first radius to said thickness being between 40 and 60.

15. A method of replacing a wear ring in an integrated drive generator comprising the steps of:

removing an existing wear ring from an integrated drive generator, the integrated drive generator including an input shaft configured to drive a differential, said differential configured to provide an input drive to a generator for generating electricity, and said differential also being connected with a hydraulic unit, said hydraulic unit including a variable swash plate, said variable swash plate being associated with a set of pistons, and a cylindrical block, said set of pistons being received in a piston retainer, a retaining ring intermediate said piston retainer and said cylinder block, and said existing wear ring positioned intermediate said piston retainer and said retaining ring, said tab on said wear ring extendable into a notch in said variable swash plate to prevent rotation of said wear ring relative to said variable swash plate; and inserting a replacement wear ring, said replacement wear ring including a cylindrical body defining an axis and having a tab extending radially outwardly of an outer cylindrical surface of said cylindrical body, said tab having a radially outer point, and a ratio of a first radius to said outer cylindrical surface from the axis to a second radius extending to the radially outer point from the axis is between 0.90 and 0.95.

16. The method of replacing a wear ring as set forth in claim 15, wherein said tab extends radially outwardly beyond the first radius for a first distance, and a ratio of said first radius to said first distance is between 10 and 15.

17. The method as set forth in claim 16, wherein said radially outer point of said tab is on a flat surface extending over a width, and a ratio of said first radius to said width is between 20 and 30.

18. The method of replacing a wear ring as set forth in claim 17, wherein said wear ring has a thickness measured parallel to the axis such that a ratio of said first radius to said thickness is between 40 and 60.

19. The method as set forth in claim 15, wherein said radially outer point on said tab is on a flat surface extending over a width, and a ratio of said first radius to said width is between 20 and 30.

20. The method of replacing a wear ring as set forth in claim 15, wherein said wear ring has a thickness measured parallel to the axis such that a ratio of said first radius to said to said thickness of said body is between 40 and 60.

* * * * *